(12) United States Patent
Huang et al.

(10) Patent No.: US 9,713,914 B2
(45) Date of Patent: Jul. 25, 2017

(54) BREATHABLE AND WATERPROOF COMPOSITE FABRIC

(71) Applicants: Chen-Cheng Huang, Taipei (TW);
Pao-Hao Huang, Taipei (TW);
Pao-Han Huang, Taipei (TW)

(72) Inventors: Chen-Cheng Huang, Taipei (TW);
Pao-Hao Huang, Taipei (TW);
Pao-Han Huang, Taipei (TW)

( * ) Notice: Subject to any disclaimer, the term of this patent is extended or adjusted under 35 U.S.C. 154(b) by 115 days.

(21) Appl. No.: 14/294,613

(22) Filed: Jun. 3, 2014

(65) Prior Publication Data

US 2014/0363625 A1    Dec. 11, 2014

(30) Foreign Application Priority Data

Jun. 11, 2013  (TW) .............................. 102120734 A

(51) Int. Cl.
*A41D 31/00* (2006.01)
*B32B 3/24* (2006.01)
(Continued)

(52) U.S. Cl.
CPC .............. *B32B 27/12* (2013.01); *A41D 31/02* (2013.01); *B32B 3/266* (2013.01); *B32B 3/30* (2013.01); *B32B 5/022* (2013.01); *B32B 5/024* (2013.01); *B32B 7/005* (2013.01); *B32B 7/02* (2013.01); *B32B 7/14* (2013.01); *B32B 27/32* (2013.01); *B32B 27/36* (2013.01); *B32B 27/40* (2013.01); *A41D 2400/22* (2013.01);
(Continued)

(58) Field of Classification Search
None
See application file for complete search history.

(56) References Cited

U.S. PATENT DOCUMENTS

| 201,640 | A | * | 3/1878 | Worth | ...................... A41D 3/04 2/87 |
| 2,032,942 | A | * | 3/1936 | Linscott | .................. B29C 41/28 156/436 |

(Continued)

FOREIGN PATENT DOCUMENTS

| BE | 530061 A | * | 7/1954 |
| CN | 1943530 A | * | 4/2007 |

(Continued)

OTHER PUBLICATIONS

Machine Translation of EP 825018 A2, Feb. 1998.*
(Continued)

*Primary Examiner* — Jeff Vonch
(74) *Attorney, Agent, or Firm* — Nixon & Vandehye P.C.

(57) ABSTRACT

A breathable and waterproof composite fabric includes: a fabric sheet having opposite first and second surfaces and defining a plurality of micropores extending through the first and second surfaces; and a waterproof plastic film of a non-porous material that is bonded to the first surface of the fabric sheet, that conforms to the first surface of the fabric sheet, and that is perforated to form a plurality of hollow protrusions extending into the micropores, respectively. The plastic film has inner and outer surfaces. The inner surface is in contact with the first surface of the fabric sheet. Each of the hollow protrusions defines a channel that extends through the inner and outer surfaces for imparting breathability to the plastic film.

11 Claims, 4 Drawing Sheets

(51) Int. Cl.
  *B32B 3/28*    (2006.01)
  *B32B 3/20*    (2006.01)
  *B32B 5/02*    (2006.01)
  *B32B 7/00*    (2006.01)
  *B32B 7/02*    (2006.01)
  *B32B 7/14*    (2006.01)
  *B32B 25/08*   (2006.01)
  *B32B 25/10*   (2006.01)
  *B32B 27/08*   (2006.01)
  *B32B 27/12*   (2006.01)
  *B32B 27/32*   (2006.01)
  *B32B 27/36*   (2006.01)
  *B32B 27/40*   (2006.01)
  *B32B 3/26*    (2006.01)
  *A41D 31/02*   (2006.01)
  *B32B 3/30*    (2006.01)
  *B32B 38/04*   (2006.01)
  *B32B 37/04*   (2006.01)
  *B32B 37/12*   (2006.01)

(52) U.S. Cl.
  CPC ...... *A41D 2500/20* (2013.01); *A41D 2500/30* (2013.01); *A41D 2500/50* (2013.01); *A41D 2500/52* (2013.01); *B32B 3/28* (2013.01); *B32B 25/08* (2013.01); *B32B 25/10* (2013.01); *B32B 27/08* (2013.01); *B32B 2250/02* (2013.01); *B32B 2250/03* (2013.01); *B32B 2274/00* (2013.01); *B32B 2305/026* (2013.01); *B32B 2307/724* (2013.01); *B32B 2307/728* (2013.01); *B32B 2307/7265* (2013.01); *B32B 2307/73* (2013.01); *B32B 2437/00* (2013.01); *Y10T 156/1056* (2015.01); *Y10T 156/1057* (2015.01); *Y10T 428/24281* (2015.01); *Y10T 428/24289* (2015.01); *Y10T 428/24322* (2015.01); *Y10T 428/24851* (2015.01); *Y10T 428/24942* (2015.01); *Y10T 442/3854* (2015.04); *Y10T 442/3886* (2015.04); *Y10T 442/3911* (2015.04); *Y10T 442/678* (2015.04); *Y10T 442/679* (2015.04)

(56) References Cited

U.S. PATENT DOCUMENTS

| | | | | | |
|---|---|---|---|---|---|
| 2,055,002 | A | * | 9/1936 | Jermain | B26F 1/24 264/156 |
| 2,068,456 | A | * | 1/1937 | Hooper | A41D 31/02 156/229 |
| 2,388,069 | A | * | 10/1945 | Yonkers, Jr. | B26F 1/28 101/26 |
| 2,485,725 | A | * | 10/1949 | Francis, Jr. | D06M 13/02 156/164 |
| 2,513,838 | A | * | 7/1950 | Beall | B26F 1/28 2/115 |
| 2,698,816 | A | * | 1/1955 | Dosmann | D06M 15/693 106/287.13 |
| 2,704,730 | A | * | 3/1955 | Herbert | D06M 15/39 38/140 |
| 2,885,303 | A | * | 5/1959 | Kaplan | D06M 15/244 139/420 R |
| 2,994,617 | A | * | 8/1961 | Proctor | D06N 3/0015 156/229 |
| 3,143,436 | A | * | 8/1964 | Dosmann | A41D 31/00 264/317 |
| 3,307,961 | A | * | 3/1967 | Stiehl | D06N 3/0054 427/243 |
| 3,331,728 | A | * | 7/1967 | Gordon | A61F 13/00021 156/253 |
| 3,627,567 | A | * | 12/1971 | Tensho | D04H 1/68 12/142 V |
| 3,665,157 | A | * | 5/1972 | Harada | B32B 27/00 219/384 |
| 3,718,059 | A | * | 2/1973 | Clayton | B26F 1/24 264/154 |
| 3,852,090 | A | * | 12/1974 | Leonard | D06B 1/143 442/107 |
| 3,911,186 | A | * | 10/1975 | Trotman | B32B 27/00 156/272.2 |
| 3,989,867 | A | * | 11/1976 | Sisson | A61F 13/5146 428/132 |
| 4,160,058 | A | * | 7/1979 | K-Gall | E04B 1/66 404/82 |
| 4,234,637 | A | * | 11/1980 | Sewell | A41D 31/0011 156/252 |
| 4,341,216 | A | * | 7/1982 | Obenour | A61F 13/51478 604/370 |
| 4,341,217 | A | * | 7/1982 | Ferguson | A61F 13/512 604/370 |
| 4,344,999 | A | * | 8/1982 | Gohlke | A41D 31/02 128/849 |
| 4,438,167 | A | * | 3/1984 | Schwarz | B01D 39/083 428/138 |
| 4,539,255 | A | * | 9/1985 | Sato | B32B 27/12 428/315.5 |
| 4,560,611 | A | * | 12/1985 | Naka | C08G 18/10 428/314.2 |
| 4,636,424 | A | * | 1/1987 | Amemiya | C08G 18/10 427/245 |
| 4,684,568 | A | * | 8/1987 | Lou | D06C 15/02 427/365 |
| 4,713,068 | A | * | 12/1987 | Wang | A61F 13/51405 428/340 |
| 4,758,297 | A | * | 7/1988 | Calligarich | B29C 65/7437 156/148 |
| 4,898,761 | A | * | 2/1990 | Dunaway | B32B 27/02 156/244.18 |
| 4,995,930 | A | * | 2/1991 | Merz | B26F 1/26 156/209 |
| 5,256,288 | A | * | 10/1993 | Lee | B01D 69/10 210/321.61 |
| 5,322,729 | A | * | 6/1994 | Heeter | A41D 31/02 118/56 |
| 5,356,497 | A | * | 10/1994 | Lee | B26F 1/28 156/231 |
| 5,359,735 | A | * | 11/1994 | Stockwell | A41D 13/0005 2/243.1 |
| 5,523,146 | A | * | 6/1996 | Bodford | A41D 31/02 156/167 |
| 5,660,918 | A | * | 8/1997 | Dutta | B32B 7/14 428/196 |
| 5,733,626 | A | * | 3/1998 | Middleton | A41D 31/02 428/131 |
| 5,773,123 | A | * | 6/1998 | Anwyll, Jr. | B32B 27/12 428/137 |
| 5,888,614 | A | * | 3/1999 | Slocum | B32B 27/32 156/164 |
| 5,935,878 | A | * | 8/1999 | Glasser | A41D 31/02 442/1 |
| 6,211,102 | B1 | * | 4/2001 | Jones | B32B 3/266 156/272.6 |
| 6,492,012 | B1 | * | 12/2002 | Shah | B32B 27/00 156/182 |
| 2003/0124308 | A1 | * | 7/2003 | Cree | A61F 13/5146 428/137 |
| 2004/0102124 | A1 | * | 5/2004 | Suzuki | A61F 13/5146 442/382 |
| 2004/0116022 | A1 | * | 6/2004 | Langley | A41D 31/02 442/289 |
| 2004/0126531 | A1 | * | 7/2004 | Harvey | B26F 1/24 428/43 |
| 2005/0273902 | A1 | * | 12/2005 | Sommers | A41D 31/02 2/69 |
| 2006/0128245 | A1 | * | 6/2006 | Muth | B26F 1/24 442/327 |

(56) References Cited

U.S. PATENT DOCUMENTS

| | | | | |
|---|---|---|---|---|
| 2010/0201024 A1* | 8/2010 | Gibson | ............ | B26F 1/20 264/156 |
| 2013/0061366 A1* | 3/2013 | Pezzimenti | ............ | A41D 31/02 2/69 |
| 2013/0280482 A1* | 10/2013 | Huang | ............ | A47G 5/00 428/133 |
| 2014/0072760 A1* | 3/2014 | Ko | ............ | B32B 7/045 428/138 |
| 2016/0257091 A1* | 9/2016 | Fornoni | ............ | B32B 37/14 |

FOREIGN PATENT DOCUMENTS

| | | | | |
|---|---|---|---|---|
| CN | 200988927 Y | * | 12/2007 | |
| CN | 201350710 Y | * | 11/2009 | |
| CN | 201419531 Y | * | 3/2010 | |
| CN | 201619264 U | * | 11/2010 | |
| CN | 101940514 A | * | 1/2011 | |
| CN | 201785645 U | * | 4/2011 | |
| CN | 102154843 A | * | 8/2011 | |
| CN | 202271606 U | * | 6/2012 | |
| CN | 102579202 A | * | 7/2012 | |
| CN | 202319182 U | * | 7/2012 | |
| CN | 202476605 U | * | 10/2012 | |
| CN | 202556842 U | * | 11/2012 | |
| CN | 202640910 U | * | 1/2013 | |
| CN | 203096486 U | * | 7/2013 | |
| CN | 103238965 A | * | 8/2013 | |
| DE | 1005037 B | * | 3/1957 | ............ D06B 15/085 |
| DE | 1560826 B | * | 1/1971 | |
| DE | 3724510 A1 | * | 2/1989 | ............ B32B 3/30 |
| DE | 282937 A | * | 9/1990 | ............ B32B 5/06 |
| EP | 403187 A1 | * | 12/1990 | ............ A61F 13/15 |
| EP | 589225 A1 | * | 3/1994 | |
| EP | 825018 A2 | * | 2/1998 | |
| EP | 1543957 A1 | * | 6/2005 | ............ B01D 69/10 |
| FR | 2612948 A3 | * | 9/1988 | ............ A41D 13/00 |
| GB | 1220405 A | * | 1/1971 | |
| GB | 1364455 A | * | 8/1974 | ............ B32B 27/00 |
| JP | 51060250 A | * | 11/1974 | |
| JP | 53111167 A | * | 9/1978 | |
| JP | 05086216 A | * | 4/1993 | |
| JP | 05124157 A | * | 5/1993 | |
| JP | 05220880 A | * | 8/1993 | |
| JP | 06032283 A | * | 2/1994 | ............ A41D 13/02 |
| JP | 11170468 A | * | 6/1999 | |
| JP | 11348163 A | * | 12/1999 | |
| JP | 2001279580 A | * | 10/2001 | |
| TW | 201202506 A | * | 1/2012 | |
| WO | WO 94/24354 A1 | * | 10/1994 | ....... A61F 13/15731 |
| WO | WO 01/03914 A1 | * | 1/2001 | ................ B26F 1/26 |

OTHER PUBLICATIONS

Machine Translation of DE 1005037 B, Mar. 1957.*
Machine Translation of CN 202271606 U, Jun. 2012.*
Machine Translation of CN 202476605 U, Oct. 2012.*
English Abstract for JP 70038760 B, Nov. 1966.*
Machine Translation of JP 05-124157 A, May 1993.*

* cited by examiner

BREATHABLE AND WATERPROOF COMPOSITE FABRIC

CROSS-REFERENCE TO RELATED APPLICATION

This application claims priority of Taiwanese application no. 102120734, filed on Jun. 11, 2013.

BACKGROUND OF THE INVENTION

1. Field of the Invention

This invention relates to a breathable and waterproof composite fabric, more particularly to a breathable and waterproof composite fabric including a fabric sheet and a plastic film having hollow protrusions extending into micropores in the fabric sheet.

2. Description of the Related Art

FIG. 1 illustrates a Gore-tex® breathable and waterproof fabric for outdoor clothing. The Gore-tex® breathable and waterproof fabric includes an outer shell 11, an inner liner 12, and a breathable and waterproof sponge-like porous membrane 13 sandwiched between two protection layers 14. The porous membrane 13 is made from a polymer, such as Teflon®, polyvinylidene fluoride (PVDF), and polyurethane, and is formed with pores in a known manner, such as that disclosed in U.S. Pat. Nos. 3,953,566 and 4,187,390. The pores formed in the porous membrane 13 have a pore diameter in the order of less than one micron in order to permit transpiration of water vapor therethrough and prevent water from passing therethrough. The porous membrane 13 has a thickness ranging from 50 microns to several hundreds of microns.

Referring to FIG. 2, U.S. Patent Application Publication No. 2004/0256310 discloses a method of making a highly breathable and waterproof fabric including a multilayered fabric sheet 21, a breathable and waterproof sponge-like porous membrane 22 (with a trade name NanoTex™) formed on the fabric sheet 21, and a hydrophilic layer 23 formed on the porous membrane 22. The method involves the steps of providing a solution of PVDF in a solvent, coating the solution on the fabric sheet 21 to form a film of the solution, and bringing a liquid material into contact with the film so as to leach the solvent from the solution of PVDF and to cause gelation of PVDF so as to form the porous membrane 22 on the fabric sheet 21. The porous membrane 22 has a pore size ranging from 100 nm to 10 microns, and preferably ranging from 100 nm to 1000 nm so as to obtain satisfactory waterproofness and breathability. In one example, the porous membrane 22 has a maximum pore size of about 0.3 micron in order to be waterproof under a 60 mph raindrop velocity. Moreover, the porous membrane 22 has a breathability ranging from 4000 to 10000 g/m$^2$/day. It is noted that FIG. 4 of the specification of U.S. Patent Application Publication No. 2004/0256310 shows a comparison between a structure of the porous membrane 22 (Manolex™) and a structure of the porous membrane 13 (Gore-tex®) of FIG. 1. Both of the structures show irregular and randomly distributed pores.

The costs of making the aforesaid porous membranes 13, 22 are high.

SUMMARY OF THE INVENTION

Therefore, an object of the present invention is to provide a breathable and waterproof composite fabric that can overcome the aforesaid drawback associated with the prior art.

According to this invention, there is provided a breathable and waterproof composite fabric that comprises: a fabric sheet having opposite first and second surfaces and defining a plurality of micropores extending through the first and second surfaces; and a waterproof plastic film of a non-porous material that is bonded to the first surface of the fabric sheet, that conforms to the first surface of the fabric sheet, and that is perforated to form a plurality of hollow protrusions extending into corresponding ones of the micropores. The plastic film has inner and outer surf aces. The inner surface is in contact with the first surface of the fabric sheet. Each of the hollow protrusions defines a channel that extends through the inner and outer surfaces for imparting breathability to the plastic film.

In drawings which illustrate embodiments of the invention,

Before the present invention is described in greater detail with reference to the accompanying preferred embodiments, it should be noted herein that like elements are denoted by the same reference numerals throughout the disclosure.

Figure 1:
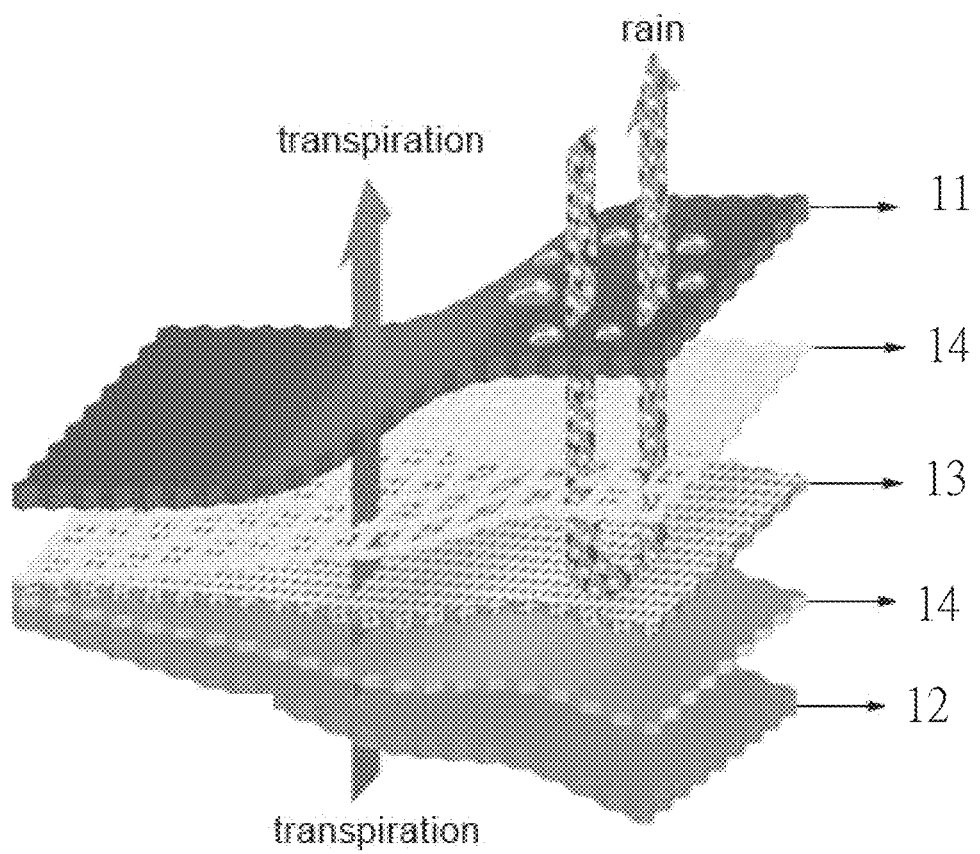
FIG. 1 is an exploded perspective view of a conventional breathable and waterproof fabric.
Figure 2:
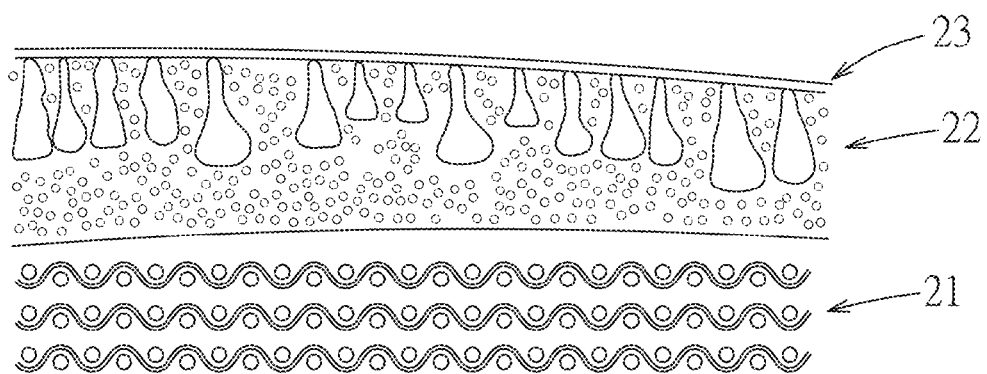
FIG. 2 is a schematic view of another conventional breathable and waterproof fabric.
Figure 3:
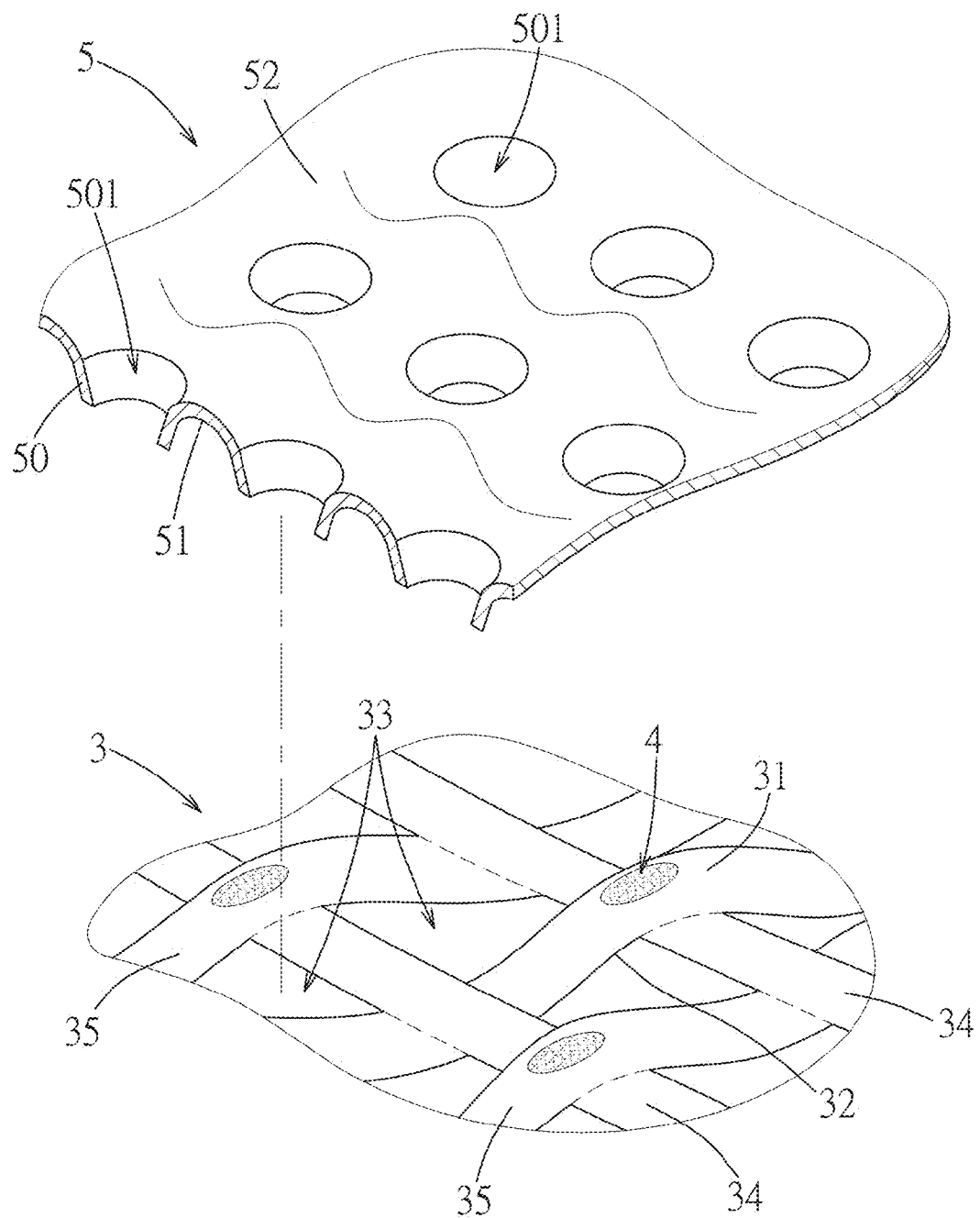
FIG. 3 is an exploded perspective view of the first preferred embodiment of a breathable and waterproof composite fabric according to the present invention.
Figure 4:
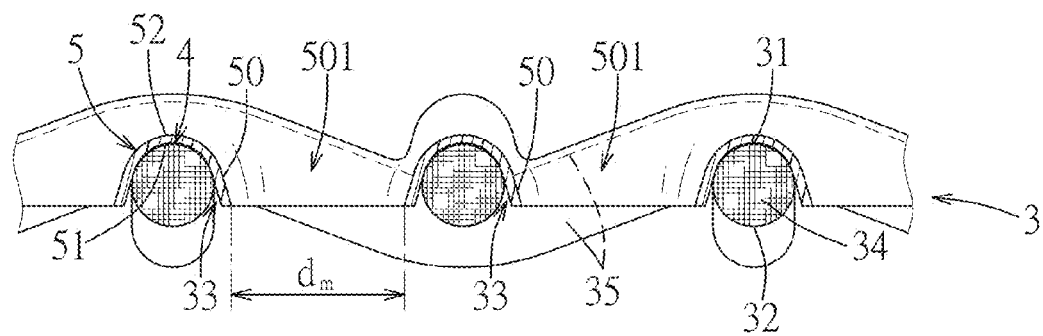
FIG. 4 is a sectional view of the first preferred embodiment.

FIGS. 3 and 4 illustrate the first preferred embodiment of a breathable and waterproof composite fabric according to the present invention. The composite fabric includes: a fabric sheet 3 having opposite first and second surfaces 31, 32 and defining a plurality of micropores 33 extending through the first and second surfaces 31, 32; a patterned adhesive layer 4; and a waterproof first plastic film 5 of a non-porous material that is bonded to the first surface 31 of the fabric sheet 3 through the patterned adhesive layer 4, that conforms to the first surface 31 of the fabric sheet 3, and that is perforated to form a plurality of hollow protrusions 50 extending into corresponding ones of the micropores 33. The first plastic film 5 has inner and outer surfaces 51, 52. The inner surface 51 is in intimate contact with the first surface 31 of the fabric sheet 3. In this embodiment, the inner surface 51 of the plastic film 5 is melt-bonded and is conformed to the first surface 31 of the fabric sheet 3 so as to be formed with an embossed texture that corresponds to a fabric texture of the first surface 31 of the fabric sheet 3. Each of the hollow protrusions 50 defines a first channel 501 that extends through the inner and outer surfaces 51, 52, that permits passage of water vapor therethrough, and that prevents water droplet from passing therethrough, thereby imparting breathability to the first plastic film 5.

The fabric sheet 3 can be a woven or a non-woven fabric. In this embodiment, the fabric sheet 3 includes a plurality of warp) yarns 34 and a plurality of weft yarns 35 that are interlaced with the warp yarns 34 so as to define the micropores 33 thereamong and the fabric texture. Alternatively, the warp yarns 34 and the weft, yarns 35 are knitted together to define the micropores 33 thereamong and the fabric texture.

In another embodiment, the fabric sheet 3 has a multilayered structure.

The patterned adhesive layer 4 is preferably formed of dots or lines of an adhesive material.

The first channel 501 has a funnel shape and a minimum diameter ($d_m$) that is preferably less than 10 microns and greater than 0.2 micron and that is more preferably less than five microns and greater than 0.5 micron so as to obtain satisfactory waterproofness and breathability.

Preferably, the micropores 33 have a diameter ranging from 20 microns to 200 microns, and the first plastic film 5 has a thickness ranging from 10 microns to 70 microns.

Each of the micropores 33 is defined by a pore-defining wall. Each of the hollow protrusions 50 is melt-bonded to the pore-defining wall of the respective one of the micropores 33.

The first plastic film 5 is preferably made from a thermoplastic material selected from the group consisting of polyolefins, polyesters and thermoplastic elastomers, and is more preferably made from polyurethane elastomers.

The first preferred embodiment can be made by a method including the steps of: applying an adhesive material in the form of dots to the fabric sheet 3 so to form the patterned adhesive layer 4 on the fabric sheet 3; bonding the first plastic film 5 to the fabric sheet 3 through the patterned adhesive layer 4; stacking the fabric sheet 3 together with the first plastic film 5 on a screen mold (not shown); heating and softening the first plastic film 5 on the fabric sheet 3; suctioning the softened plastic film 5 through vacuum perforation techniques using a suctioning device (not shown) so as to form the hollow protrusions 50 on the first plastic film 5 and to permit melt bonding of the plastic film 5 to the fabric sheet 3, thereby forming the composite fabric; and cooling and removing the composite fabric from the screen mold. The method of this invention is advantageous in that the minimum diameter ($d_m$) of the first channels 501 in the first plastic film 5 can be easily adjusted by adjusting the thickness of the first plastic film 5 and the diameter of the micropores 33 in the fabric sheet 3. In addition, the size of the hollow protrusions 50 can be adjusted by adjusting the diameter of the micropores 33, and the density of the hollow protrusions 50 can be adjusted by adjusting the number of mesh holes in the screen mold. The higher the density of the hollow protrusions 50, the higher will be the breathability of the first plastic film 5. Alternatively, a portion of the channels 501 can be in the form of blind holes, i.e., instead of extending through the inner and outer surfaces 51, 52 (as in the case of a through-hole), each extending through only the outer surface 52 and not through the inner surface 51. As such, by adjusting the ratio of the number of the blind holes to the number of the through-holes, the breathability and the waterproofness of the composite fabric can be adjusted.

Figure 5:
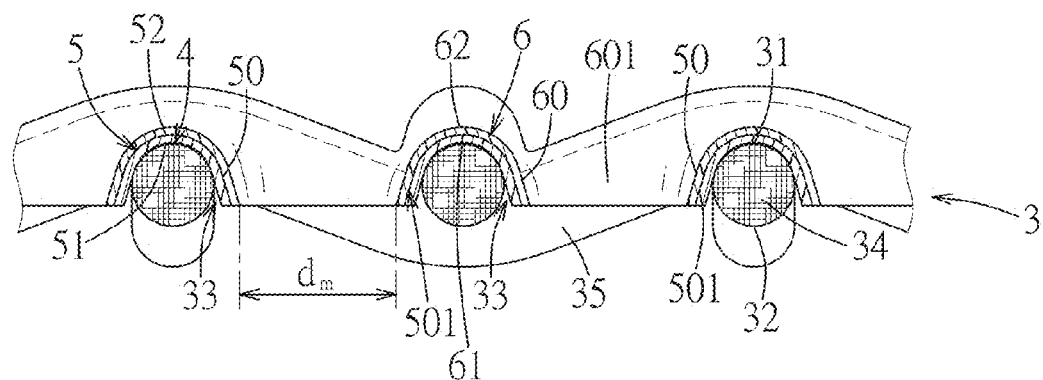
FIG. 5 is a sectional view of the second preferred embodiment of the breathable and waterproof composite fabric according to the present invention.

FIG. 5 illustrates the second preferred embodiment of the breathable and waterproof composite fabric according to the present invention. The second preferred embodiment differs from the previous embodiment in that a second plastic film 6 is further included in the composite fabric. In this embodiment, the second plastic film 6 is bonded to the outer surface 52 of the first plastic film 5, has inner and outer surfaces 61, 62, and is formed with a plurality of hollow projections 60 which extend into the first channels 501 in the hollow protrusions 50, respectively. The second, plastic film 6 is melt-bonded to the first plastic film 5 by stacking and thermally softening the first and second plastic films 5, 6, followed by suctioning the softened first and second plastic films 5, 6 through vacuum perforation techniques. Each of the hollow projections 60 defines a second channel 601 that extends through the inner and outer surfaces 61, 62 for passage of water vapor and air therethrough. The second channel 601 has a minimum diameter less than that of the first channel 501, thereby enhancing the waterproofness of the composite fabric as compared to the previous embodiment.

Preferably, the second plastic film 6 is made from a thermoplastic material selected from the group consisting of polyolefins, polyesters and thermoplastic elastomers.

Preferably, the first plastic film 5 is made from a hydrophobic elastomeric material, and the second plastic film 6 is made from a hydrophilic elastomeric material so as to enhance transpiration of the composite fabric.

With the inclusion of the first plastic film 5 in the composite fabric of the present invention, the aforesaid drawback associated with the prior art may be alleviated.

While the present, invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A breathable and waterproof composite fabric comprising:
   a fabric sheet having opposite first and second surfaces and defining a plurality of micropores extending through said first and second surfaces; and
   a waterproof first plastic film of a non-porous material that is bonded to said first surface of said fabric sheet, that conforms to said first surface of said fabric sheet, and that is perforated to form a plurality of hollow protrusions extending into corresponding ones of said micropores, said first plastic film having inner and outer surfaces, said inner surface being in contact with said first surface of said fabric sheet;
   wherein each of said hollow protrusions defines a channel that has a funnel shape and that extends through said inner and outer surfaces for imparting breathability to said first plastic film,
   wherein channel has a minimum diameter of less than five microns and greater than 0.5 micron, and
   wherein each of said micropores have a diameter ranging from 20 microns to 200 microns.

2. The composite fabric of claim 1, wherein said inner surface of said first plastic film is melt-bonded to said first surface of said fabric sheet.

3. The composite fabric of claim 1, wherein said first plastic film is made from a thermoplastic material selected from the group consisting of polyolefins, polyesters and thermoplastic elastomers.

4. The composite fabric of claim 3, wherein said first plastic film is made from polyurethane elastomers.

5. The composite fabric of claim 1, further comprising a second plastic film that is bonded to said outer surface of said first plastic film and that is formed with a plurality of hollow projections which extend into said channels in said hollow protrusions, respectively.

6. The composite fabric of claim 5, wherein said second plastic film is made from a thermoplastic material selected from the group consisting of polyolefins, polyesters and thermoplastic elastomers.

7. The composite fabric of claim 6, wherein said first plastic film is made from a hydrophobic elastomeric material and said second plastic film is made from a hydrophilic elastomeric material.

8. The composite fabric of claim 1, wherein said first plastic film has a thickness ranging from 10 microns to 70 microns.

9. The composite fabric of claim 1, wherein said fabric sheet is one of a woven fabric and a non-woven fabric.

10. The composite fabric of claim 1, wherein said fabric sheet includes a plurality of warp yarns and a plurality of weft yarns that are interlaced with said warp yarns so as to define said micropores thereamong.

11. The composite fabric of claim 1, further comprising a patterned adhesive layer, said waterproof first plastic film being bonded to said first surface of said fabric sheet through said adhesive layer.

\* \* \* \* \*